United States Patent [19]
Rubin

[11] 3,857,398
[45] Dec. 31, 1974

[54] ELECTRICAL CARDIAC DEFIBRILLATOR

[76] Inventors: Leo Rubin, 301-17 Spring St., Red Bank, N.J. 07701

[22] Filed: Dec. 13, 1971

[21] Appl. No.: 207,148

[52] U.S. Cl. ... 128/419 D, 128/2.06 A, 128/2.06 F, 128/419 P
[51] Int. Cl............................................. A61n 1/36
[58] Field of Search ........ 128/419 D, 419 P, 419 R, 128/421, 422, 2.06 A, 2.06 F, 2.06 R

[56] References Cited
UNITED STATES PATENTS

| | | | |
|---|---|---|---|
| 3,547,108 | 12/1970 | Seiffert | 128/419 D |
| 3,528,428 | 9/1970 | Berkovits | 128/419 P |
| 3,614,955 | 10/1971 | Mirowski | 128/419 D |
| 3,144,019 | 8/1964 | Haber | 128/2.06 A |
| 3,352,300 | 11/1967 | Rose | 128/2.06 A |
| 3,236,239 | 2/1966 | Berkovits | 128/419 D |
| 3,460,542 | 8/1969 | Gemmer | 128/419 P |

OTHER PUBLICATIONS
Stratbrucker et al., "Rocky Mountain Engineering Society," 1965, pp. 57-61.

Primary Examiner—William E. Kamm
Attorney, Agent, or Firm—Harry M. Saragovitz et al.

[57] ABSTRACT

The combination of a defibrillator, demand pacer, analyzer-control device, and a set of electrodes for detecting and analyzing electrical activity of the heart and for electrically stimulating the heart. The cardiac electrical pulses detected by a first pair of electrodes placed in the heart are analyzed by pulse rate and pulse duration detectors, to determine the average pulse rate and pulse width over some predetermined period. A threshold logic circuit connected to the outputs of the pulse rate and duration detectors produces an output pulse when the pulse rate of the heart exceeds a predetermined average rate and when simultaneously each of the pulses in the period has a pulse duration longer than a given period. This output pulse energizes the defibrillator which in turn applies a defibrillating pulse to the heart via a second pair of electrodes. A demand pacer, having the input thereof connected to the analyzer-control, receives the heart pulses and on demand produces pulses at the first pair of electrodes to stimulate the heart when the heart rate falls below a predetermined value.

12 Claims, 5 Drawing Figures

ELECTRICAL CARDIAC DEFIBRILLATOR

The invention described herein may be manufactured, used and licensed by or for the Government for governmental purposes without the payment to us of any royalty thereon.

BACKGROUND OF THE INVENTION

The present invention relates to cardiac stimulators and more particularly to therapeutic instruments which electrically stimulate the heart transvenously.

In the field of cardiology it has been the general practice to employ electrical stimuli to the heart for the treatment of certain coronary heart diseases. The defibrillator has found widespread use in the treatment of those coronary heart diseases which culminate in ventricular tachycardia or ventricular fibrillation. When rapid and irregular heart beats are detected, therapeutic defibrillation is instituted by applying a relatively high energy electrical pulse to the heart which produces a synchronization of the fibers of the heart and a subsequent return to a normal rhythm. In the event that spontaneous rhythm does not occur subsequent to defibrillation, a pacer is then used to stimulate the heart at a normal rhythm.

The above procedures are normally carried out in intensive care units which are equipped with heart monitoring equipment. Operation of the monitoring equipment usually requires the constant attention of specially trained personnel who are capable of making quick judgement decisions. For example, some cardiac monitoring equipments have warning devices such as lights or buzzers which are energized when a patient's heart beat exceeds a predetermined rate. The actual heart beat or electrical activity is also displayed on a CRT. When the warning device is energized, a judgement decision is made by the attendant after studying the CRT display as to whether or not defibrillation is necessary or whether a physician should be called to make an additional analysis. If defibrillation is judged to be in order, the attendant then places the defibrillator electrodes on the patient and energizes the defibrillator.

It has been determined that in most cases, the sooner defibrillation is instituted, the smaller will be the amount of electrical energy required to accomplish defibrillation. It has also been shown that myocardial damage will be a minimum when the defibrillating energy is a minimum. Therefore attempts have been made to completely automate the above defibrillating process so that the time lost in the defibrillation procedure is a minimum, thereby minimizing myocardial damage.

Of course, a completely automatic defibrillator has other advantages. For example, the attending physicians may be relieved of many tasks and in some cases, the patient can be removed from the intensive care unit. Also, an automatic defibrillator and demand pacer combination may be implanted in the body of the patient, who can then actually leave the hospital and carry on many of his normal daily functions.

SUMMARY OF THE INVENTION

The general object of this invention is to provide a therapeutic instrument which automatically detects and analyzes the electrical activity of the heart and responds to certain predetermined parameters of the QRS complexes by electrically stimulating the heart so that abnormal heart beats can be corrected. To attain this, the present invention contemplates a combination of a defibrillator, pacer and a unique heart beat analyzer-control device which analyzes automatically the QRS complexes of a heart beat and, when necessary, applies proper defibrillator or pacer pulses to the heart.

DETAILED DESCRIPTION OF THE DRAWINGS

Other objects and features of the invention will becomes apparent to those skilled in the art as the disclosure is made in the following description of a preferred embodiment of the invention as illustrated in the accompanying sheets of drawings in which.

DETAILED DESCRIPTION OF THE PREFERRED EMBODIMENT

Figure 1:
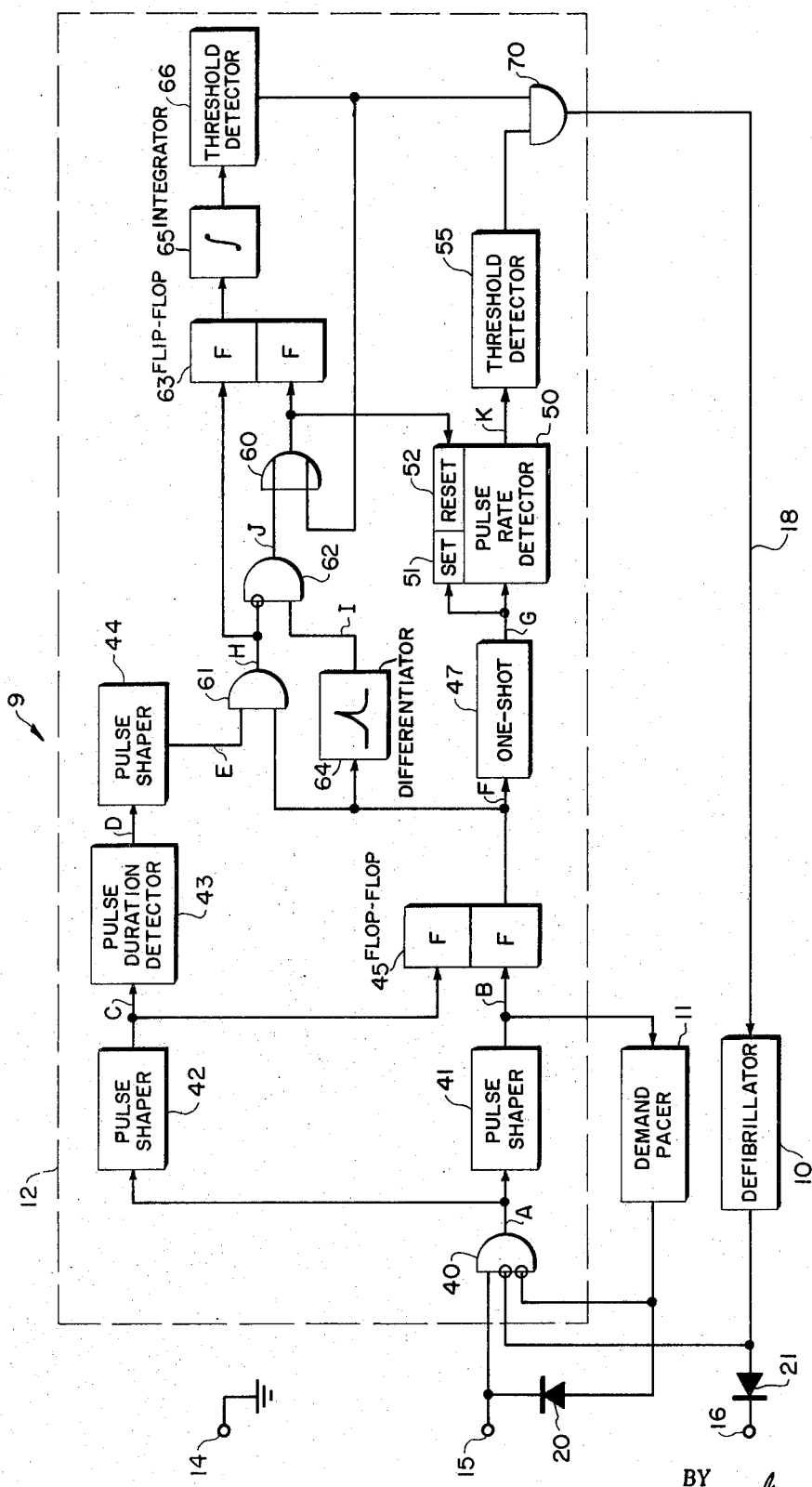
FIG. 1 is a block diagram of a preferred embodiment of the invention.

Referring now to the drawing, there is shown in FIG. 1 an automatic cardiac stimulator 9 having a defibrillator 10, a demand pacer 11, and an analyzer-control 12.

In general, the analyzer-control 12 will sense and analyze voltages generated in the heart via terminals 14 and 15. If the sensed voltages have predetermined characteristics, as will be described later, the analyzer-control 12 will energize defibrillator 10 via line 18.

The demand pacer 11 and the defibrillator 10 are well known devices and will not be described in detail. Briefly, the demand pacer 11 is simply a heart stimulator which may include a timing device and a pulse generating circuit. If after some predetermined time, say one second, a heart pulse has not been sensed by analyzer-control 12, or if bradyarrythmia occurs (viz. pulse rate less than 50 beats/minute) then the pulse generating circuit of pacer 11 would transmit a pulse or pulses to the heart via terminal 15 to stimulate the heart.

Likewise, the defibrillator 10 includes a pulse circuit which transmits a relatively strong pulse to the heart via terminal 16 for therapeutically shocking the heart after some predetermined condition in the heart beat has been sensed by analyzer-control 12.

Figure 2:
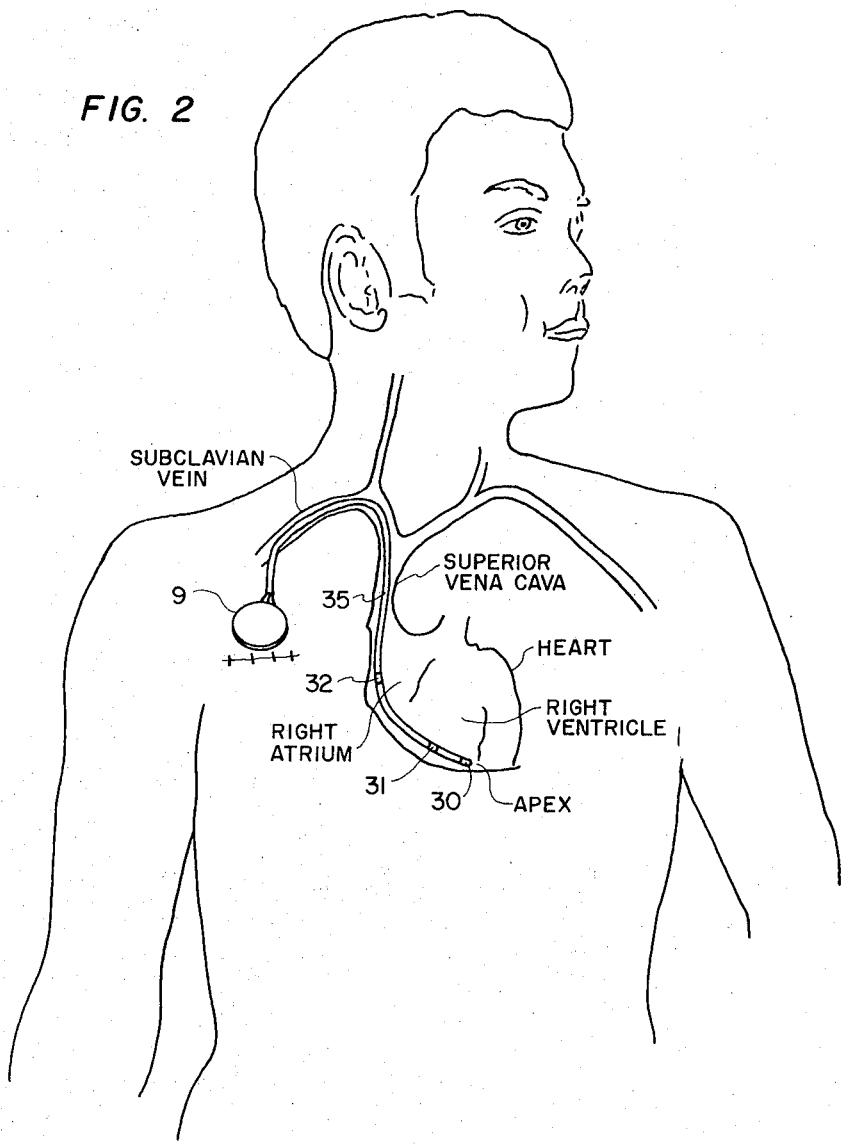
FIG. 2 illustrates a diagrammatic view of the apparatus in situ.
Figure 3:
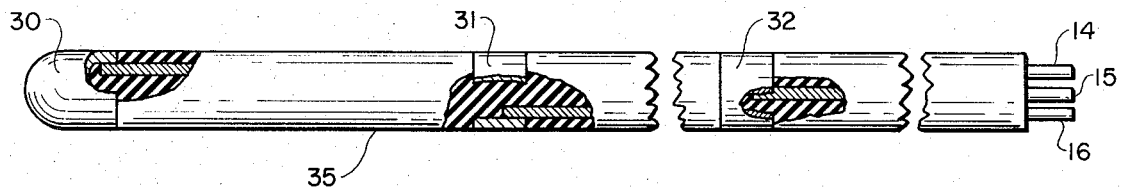
FIG. 3 shows a sectional view of a portion of the device shown in FIG. 2.

When in use, the terminals 14, 15 and 16 are connected to three electrodes 30, 31 and 32 respectively which are mounted on the catheter 35 shown in FIG. 3. As shown in FIG. 2, the automatic cardiac stimulator 9 may be implanted in a patient with the catheter 35 extending into the heart via the subclavian vein and the superior vena cava. The ground or reference electrode 30, mounted on the tip of catheter 35, is positioned at the apex of the right ventricle. Electrode 31 is positioned in the right ventricle and electrode 32 is positioned in the right atrium. The pacing pulses from demand pacer 11 are applied to the right ventricle across electrodes 30 and 31. The defibrillating pulses from defibrillator 10 are applied transvenously across electrodes 30 and 32. The analyzer-control 12 senses the voltages in the right ventricle which appear across electrodes 30 and 31.

Figure 5:
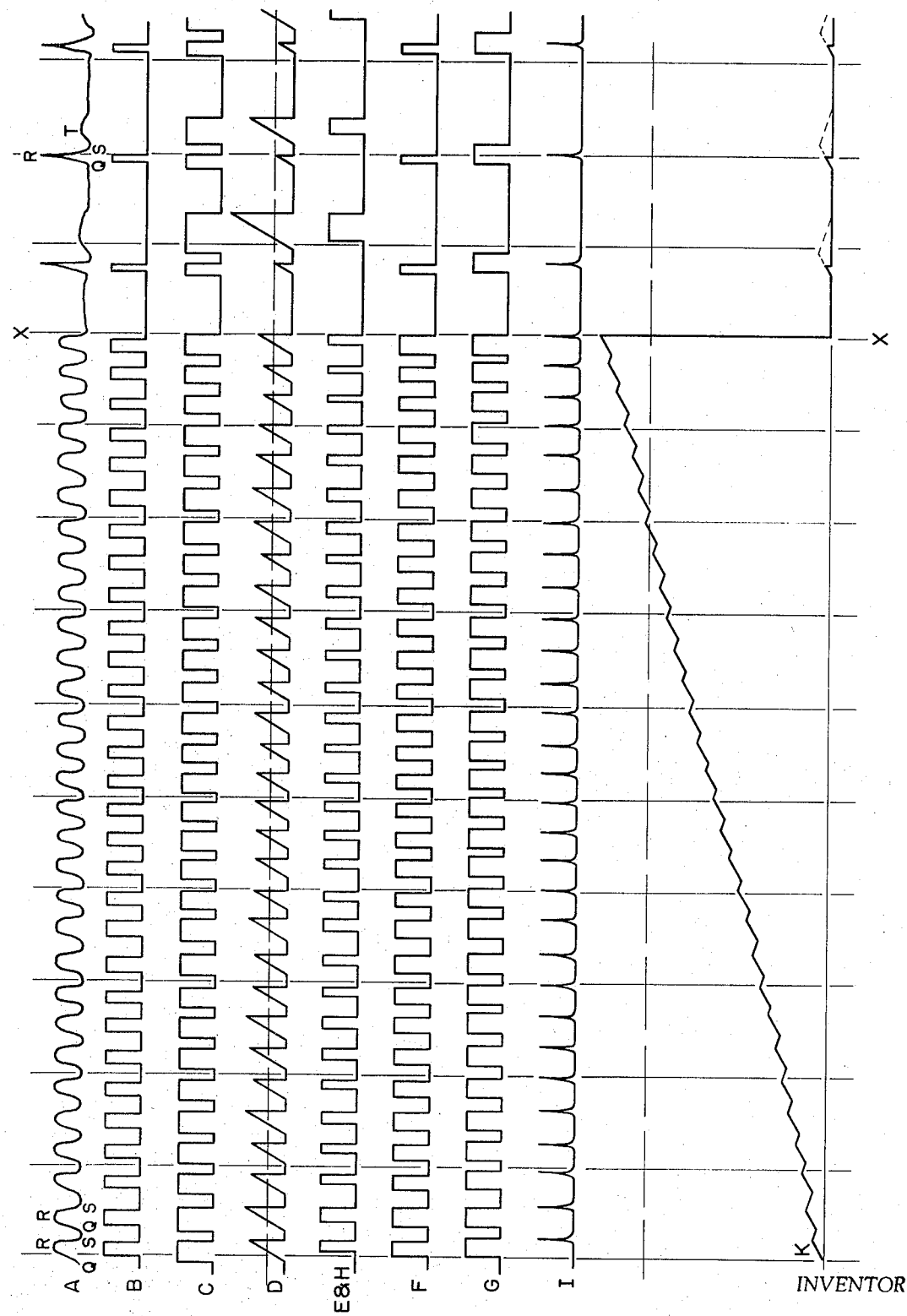
FIGS. 4 and 5 are waveforms useful in describing the invention.
Figure 4:
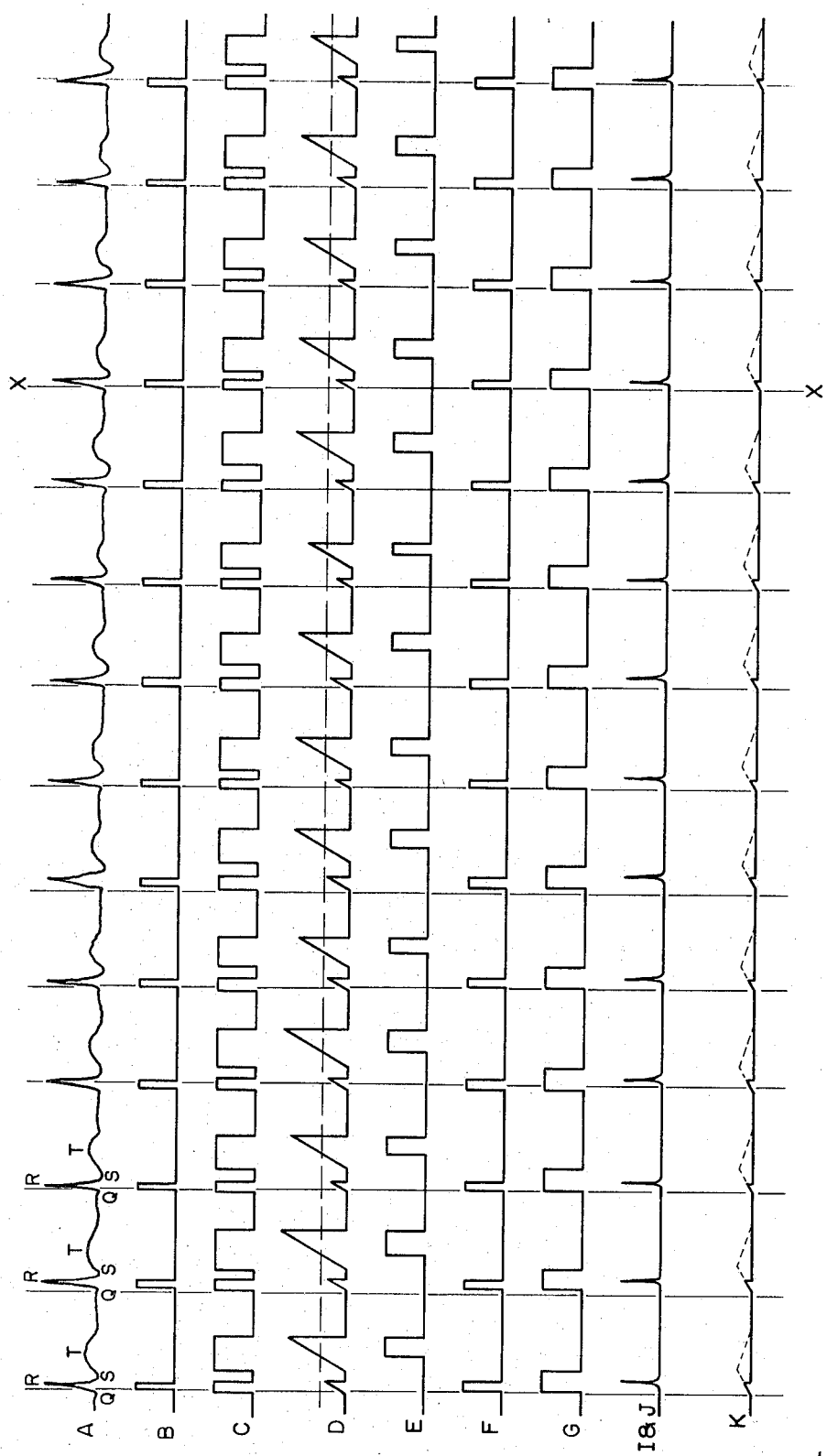

The detailed description and operation of the automatic cardiac stimulator 9 will now be presented with particular reference to FIGS. 1, 4 and 5. In both FIGS. 4 and 5, the letters A–K identify waveforms which appear at similarly identified output points in the block diagram of FIG. 1. The waveforms in FIG. 4 represent the typical response of analyzer-control 12 to a heart undergoing ventricular tachycardia or ventricular fibrillation with a subsequent return to a normal rhythm.

It is one of the functions of the analyzer-control 12 to determine the rate of occurrence of the QRS complexes and the duration of the Q to S periods as they appear in waveforms A. If the average rate of occurrence of the QRS complexes exceeds a predetermined value over a given time interval, for example 150 per minute for 10 seconds, and if the duration of each of the Q to S periods in the given time interval exceeds a given period, for example 120 milliseconds, then a pulse will be generated by analyzer-control 12 on line 18 to energize defibrillator 10.

In FIG. 4, waveform A represents a typical voltage wave generated in a heart beating with a normal rhythm. The QRS complex is shown as a sharp impulse having a relatively short Q to S period followed by a T wave having an amplitude substantially less than the R value. In FIG. 5, the first part of waveform A, i.e., the portion to the left of the line X, represents a typical voltage wave generated in a heart undergoing ventricular tachycardia or ventricular fibrillation. The QRS complexes occurring to the left of line X occur at a relatively high rate and the Q to S periods are substantially longer than in the normal case. Although the QRS complexes have been flattened, the R amplitude is still greater than the amplitude of the T wave.

The portion of waveform A to the right of line X in FIG. 5 again represents a heart beating with a normal rhythm. As will be seen later, it is assumed that the heart is defibrillated and resumes normal rhythm at the time represented by line X.

As an aid in visualizing the operation, it may be assumed that each of the vertical lines in FIGS. 4 and 5 are spaced one second apart and that the distance from the left side of FIG. 5 to line X covers a period of ten seconds.

Analyzer-control 12 includes a transmission gate 40 having the transmission input thereof connected to terminal 15. Two enable inputs to gate 40 are connected to the outputs of pacer 11 and defibrillator 10 via inverters. Therefore, if neither the pacer 11 nor defibrillator 10 are operating, then gate 40 is in the enable state and the voltages on terminal 15 are transmitted to the inputs of pulse shapers 41 and 42. The transmission gate 40 may also have appropriate circuitry for conditioning the input signals A with proper amplification and filtering. For example, in some cases, filtering of induced voltages caused by devices such as electric razors, automobile ignition systems, etc. may be necessary. It is also assumed that the proper gain is applied to all signals where necessary.

The QRS complexes in waveform A are converted into well defined rectangular pulses by pulse shaper 41 to produce waveform B at the output. The pulse shaper 41 may be a base clipper or the like which produces a constant positive voltage at the output for all input voltages which exceed a predetermined value. The clipping voltage would be set at a value greater than the maximum amplitude of the normal T waves. Signal B will therefore be a series of rectangular pulses occurring in phase with the QRS complexes and having pulse widths less than the Q to S periods. The pulse shaper 41 therefore functions as a device for detecting the occurrence of the QRS complexes.

It is pointed out that the pulse shaper 41 may alternatively include a differentiator which produces a well defined rectangular pulse each time the slope or first derivative of the input wave goes through some relatively high positive value, since the QRS complexes always has a slope greater than the slope of the T wave.

The Q to S periods of the QRS complexes in waveform A are detected via the pulse shaper 42. Pulse shaper 42 may include a hard clipper which forms a series of well defined positive rectangular pulses having leading and trailing edges occurring in phase with all zero crossings in waveform A. The output of pulse shaper 42 is represented by waveform C.

The output C of pulse shaper 42 is connected to the input of a pulse duration detector 43 which produces an output signal D having a maximum amplitude which is a function of the pulse duration of the pulse in waveform C. Detector 43 might, for example, include a capacitor which is charged through a large resistor and a diode by the pulses in waveform C and is discharged sharply by the trailing edges of the pulses in waveform C.

The output D of pulse duration detector 43 is connected to the input of a third pulse shaper 44 which generates a series of well defined rectangular pulses, one pulse each time the amplitude of waveform D exceeds the horizontal dashed line. Here again, the pulse shaper 44 may be a base clipper. The predetermined value below which the waveform D is clipped, i.e., the height of the horizontal dashed line represents a pulse duration in waveform C which is less than the value to be detected, e.g. 120 milliseconds. Therefore, the pulses in waveform C appear in phase with all positive sections of waveform A having a time duration at or near the base or zero line greater than the specified value, e.g. 120 milliseconds.

A flip-flop 45 has the set and reset inputs connected to the outputs B and C of pulse shapers 41 and 42 respectively. The flip-flop 45 is set on the leading edge of a pulse and is reset on the trailing edge of a pulse. Therefore, the output F of flip-flop 45 will be a series of rectangular pulses having leading edges in phase with the leading edges of the pulses in waveforms B and trailing edges in phase with the trailing edges of the pulses in waveform C which in turn are in phase with the S points of the QRS complexes of the waveform A.

The output F of flip-flop 45 is connected to the input of a one shot 47 which generates a series of pulses having the leading edges in phase with the leading edges of the pulses in the input waveform F and having a fixed duration and amplitude. The output waveform G of one shot 47 is fed to the input of a pulse rate detector 50 which in turn has an output K having an amplitude which grows at a rate proportional to the integral of the positive pulses in waveform G and slowly approaches zero along a negative slope when waveform G is zero.

One embodiment of the detector 50 would be a capacitor which is charged by waveform G through a first resistor and diode and is discharged through a second resistor and diode when waveform G is zero. The RC time constants of the discharging circuit and the charging circuit could be equal or different but would be chosen such that when the average rate of occurrence of the pulses in waveform G over a given time interval, e.g. 10 seconds, is less than some predetermined value, e.g. 150 per minute, then the output voltage K of detector 50, i.e., the charge on the capacitor, would be less than some predetermined threshold. The characteristics of waveform K will be described later in greater detail. The output of detector 50 is connected to a threshold detector 55 which generates a positive output when the output of pulse rate detector 50 exceeds the aforementioned predetermined value shown by a horizontal dashed line in FIG. 5.

Pulse rate detector 50 also includes a set device 51 and a reset device 52. Set device 51 is energized by the trailing edges of the pulses in waveform G to enable the detector 50. Reset device 52 is energized by the output of OR gate 60 to reset the output of detector 50 to zero and disable the detector 50 until it is again enabled by set device 51.

The set device 51 and reset device 52 might include a flip-flop plus some logic elements. When reset device 52 is energized, a logic gate may be closed connecting ground to the charged capacitor in detector 50, thereby dumping the charge on the capacitor to ground. When the set device 51 is energized, the ground would be removed from the capacitor which can now be charged with the pulses in waveform G as described earlier. The conditions under which detector 50 is set and reset is important to the inventive concept and will also be described in greater detail. The particular circuit details to accomplish the function is arbitrary and are therefore not shown.

The output E of pulse shaper 44 and output F of flip-flop 45 constitute the two inputs to AND gate 61. It is pointed out again that each time a QRS complex appears in waveform A, a corresponding pulse appears in waveform F. Also, the trailing edges of the pulses in waveform F are in phase with the S points in waveform A. Further, the pulses appearing in waveform E are a result of positive wave sections in waveform A having zero crossings or base widths greater than some predetermined value, e.g. 120 milliseconds. Therefore there will be an output pulse from AND gate 61 each time both of these conditions occur simultaneously, i.e., there is a QRS complex and the Q to S period is greater than the prescribed value, e.g. 120 milliseconds.

Since in the example of FIG. 4 the heart beat is assumed normal, i.e., the Q to S time periods are all less than the limit, e.g. 120 milliseconds, there will be no output from AND gate 61 and therefore no waveform H appears in FIG. 4.

However in the example of FIG. 5, the heart beat is initially assumed not normal and the Q to S time periods are assumed greater than the limit, e.g. 120 milliseconds. In this case, there will be an output from AND gate 61 and the waveform H to the left of line X will be identical to waveform E.

The output H from AND gate 61 is inverted and anded in AND gate 62 with the output I of trailing edge detector 64 which is connected to the output F of flip-flop 45. The trailing edge detector 64 may be implemented with a differentiator which produces a positive impulse when the slope of the input goes highly negative. The output J of AND gate 62 is connected to the set side of flip-flop 63 via OR gate 60. The output H from AND gate 61 is connected to the reset side of flip-flop 63. The flip-flop 63 will be set by those trailing edges of the pulses in waveform F which do not occur in phase with a pulse in waveform H. In other words, if at a particular time waveform H is zero and a trailing edge of a pulse in waveform F occurs, then an impulse will appear in waveform J which will set the flip-flop 63 via OR gate 60.

In the example of FIG. 4, all of the impulses in waveform I will be passed by AND gate 62, since the output H from AND gate 61 is zero. Therefore, in this example, waveforms I and J will be identical.

In the example of FIG. 5, there will be no output from AND gate 62 during the period left of the line X, because all of the impulses in waveform I occur when waveform H is positive.

The flip-flop 63 is reset on the leading edges of the pulses in waveform H. Of course, after the flip-flop 63 is reset, a second reset pulse will have no effect on the flip-flop 63. The same is also true of the set pulses when flip-flop 63 is in the set state.

To summarize, there will be an impulse in waveform J each time a QRS complex occurs having a Q to S distance less than the prescribed time limit, e.g. 120 milliseconds. Therefore, if flip-flop 63 is in the reset state, it will be set by the first occurrence of a normal QRS complex. On the other hand, if flip-flop 63 is in the set state, it will be reset by the first occurrence of a QRS complex which is not normal.

The output of flip-flop 63 will be integrated over time by an integrator 65 which may simply be an RC circuit. The output of integrator 65 is connected to the input of a threshold detector 66 which produces an output pulse when the input from integrator 65 reaches a predetermined value. This value is chosen such that the output pulse from the threshold detector 65 appears some predetermined time after flip-flop 63 is reset by a pulse in waveform H. For example, if the predetermined time is ten seconds, as is assumed in the example in FIG. 5, and if for a ten second period all of the Q to S periods are greater than the prescribed time limit, e.g. 120 milliseconds, then a pulse will appear at the output of threshold detector 66. If at any time in a 10 second interval a normal QRS complex should appear, the flip-flop 63 will be set, the output of integrator 65 will be reset to zero, and measurement of the 10 second interval will be terminated. The next measurement of a 10 second interval is initiated with the next occurrence of a QRS complex in waveform A which has a Q to S period greater than the prescribed time limit.

As mentioned earlier, the output of threshold detector 55 will be positive when the waveform K exceeds the horizontal dashed line in FIG. 5. In the example of FIG. 4, the output of pulse rate detector 50 is represented by the solid line sawtooth path in waveform K. The output of detector 50 starts to increase along a linear path (the capacitor begins to charge up) but is interrupted by the impulses J which resets the detector 50 via the output of OR gate 60 (the capacitor is rapidly discharged). If the detector 50 was not reset by a pulse J, then the output K would follow the dashed line sawtooth path in waveform K. In other words, the capacitor in detector 50 would be charged by the positive pulses in waveform G and discharged when waveform G is zero. In any case, the waveform K in FIG. 4 never reaches an appreciable positive value (the threshold) for two reasons: (1) the rate of occurrence of the QRS complexes is less than the limiting value and (2) all of the Q to S periods are less than the limiting value. If only the first reason existed and all the Q to S periods were actually greater than the prescribed value, the waveform K would follow the dashed line sawtooth path and the threshold would still not be reached since the rate of occurrence of the QRS complexes is low. On the other hand, if the rate were high but the Q to S periods were short, output K of detector 50 would still not reach the threshold value because detector 50 would be reset by waveform J via OR gate 60.

Because the rate of occurrence of the pulses in waveform G to the left of line X in FIG. 5 is greater than the prescribed value and because the pulse rate detector 50 is not reset during this ten second period, the output K of detector 50 gradually climbs and passes the threshold value represented by the horizontal dashed line. If during the period to the left of line X in FIG. 5 a QRS complex had appeared which had a Q to S distance less than the prescribed value, detector 50 would be reset and the output K would instantaneously go to zero.

When the output of threshold detector 66 becomes positive indicating that the prescribed ten second time period is over, the pulse rate detector 50 is reset to zero by the output of detector 66 via OR gate 60. The flip-flop 63 is also set by the output of threshold detector 66 via OR gate 60. This situation is indicated by the line X in FIG. 5. At this time, the defibrillator 10 is energized via AND gate 70 and line 18, because the outputs from both threshold detectors 55 and 66 are positive. In other words, if over the prescribed time interval, e.g. 10 seconds, the average rate of occurrence of the QRS complexes is greater than the prescribed average, as measured by threshold detector 55, e.g. 150 per minute, and if each and every QRS complex appearing in that same 10 second interval has a Q to S time period greater than the prescribed time, e.g., 120 milliseconds, then the output of AND gate 70 goes positive and defibrillator 10 is energized. Also, the analyzer-control 12 is reset to the original state.

Finally, the demand pacer 11 uses the pulses in waveform B as a control to provide stimulating pulses to the heart via terminal 15 when a prescribed time period, say one second, is exceeded in which a QRS complex is not detected or when bradyarrythmia occurs. Defibrillators and demand pacer devices are well known and are therefore not described in detail.

Obviously many modifications and variations of the present invention are possible in the light of the above teachings. Of course, it should be understood, that the specific values used for the heart beat rate, Q-S period etc. are only examples. In the present example, it is assumed that each and every Q to S period must exceed a predetermined value during the measured period before defibrillation is performed. In some cases, the device may be readily modified such that all but two, three, etc. Q to S periods, for example, exceed the given valve. It is therefore to be understood that within the scope of the appended claims, the invention may be practiced otherwise than as specifically described.

What is claimed is:

1. Apparatus for electrically stimulating the heart comprising:
    electrode means;
    sensing means having an input connected to said electrode means for sensing cardiac electrical signals;
    pulse rate detector means for detecting the average rate of occurrence of the QRS complexes of said cardiac electrical signals over a predetermined time period;
    pulse duration detector means for detecting the Q to S period of each said QRS complex in said cardiac electrical signal, said pulse duration detector means being connected to said pulse rate detector means to permit rate detection for pulses whose duration is greater than a predetermined value;
    threshold logic means connected to said pulse rate detector means and said pulse duration detector means for providing an output pulse when the average rate of occurrence of said QRS complexes exceeds a predetermined value and a predetermined number of said Q to S periods exceed a predetermined time period; and
    defibrillator means connected to the output of said logic means for generating a defibrillating pulse on said electrode means in response to receiving a pulse from said threshold logic means.

2. Apparatus according to claim 1 and further including disable means connected between the output of said defibrillator means and said sensing means for disabling said sensing means when said defibrillating pulse is generated.

3. Apparatus according to claim 1 and further including pacer means having the input thereof connected to said sensing means for generating pacing pulses on said electrode means when the rate of occurrence of said QRS complexes falls below a predetermined level.

4. Apparatus according to claim 3 and further including disable means connected from the outputs of said defibrillator means and said pacer means to said sensing means for disabling said sensing means when either one of said defibrillating pulses or one of said pacing pulses is generated.

5. Apparatus according to claim 4 and wherein said electrode means includes first, second and third spaced electrodes;
    said input of said sensing means connected to said first and second electrodes;
    the output of said pacer means connected to said first and second electrodes; and
    the output of said defibrillator means connected to said first and third electrodes.

6. Apparatus according to claim 5 further including a catheter; said first electrode mounted at the distal end of said catheter; and said second and third electrodes spaced in succession along said catheter.

7. Apparatus for electrically stimulating the heart comprising:
    electrode means;
    sensing means having the input thereof connected to said electrode means for sensing cardiac electrical signals;
    amplitude detector means connected to said sensing means for passing pulses greater than a predetermined amplitude;

pulse duration detector means connected to said sensing means for detecting the duration of the pulses in said cardiac electrical signal;

pulse rate detector means connected to said amplitude detector means and said pulse duration detector means for detecting the average rate of occurrence of those pulses passed by said amplitude detector means which have a pulse duration greater than a predetermined value, as measured by said duration detector means;

threshold logic means, including timing means controlled by said pulse duration detector means, connected to the outputs of said pulse rate detector means for generating an output pulse when said average rate exceeds a predetermined threshold in a given time as measured by said timing means; and defibrillator means connected to the output of said logic means for generating a defibrillating pulse on said electrode means in response to receiving a pulse from said threshold logic means.

8. Apparatus according to claim 7 and further including disable means connected between the output of said defibrillator means and said sensing means for disabling said sensing means when said defibrillating pulse is generated.

9. Apparatus according to claim 7 and further including pacer means having the input thereof connected to the output of said amplitude detector means for generating pacing pulses on said electrode means when the pulse rate at the output of said amplitude detector means falls below a predetermined value.

10. Apparatus according to claim 9 and further including disable means connected from the outputs of said defibrillator means and said pacer means when either one of said defibrillating pulses or one of said pacing pulses is generated.

11. Apparatus according to claim 10 and wherein said electrode means includes first, second and third spaced electrodes;

said input of said sensing means connected to said first and second electrodes;

the output of said pacer means connected to said first and second electrodes; and the output of said defibrillator means connected to said first and third electrodes.

12. Apparatus according to claim 11 further including a catheter said first electrode mounted at the distal end of said catheter; and said second and third electrodes spaced in succession along said catheter.

* * * * *